Patented Jan. 17, 1950

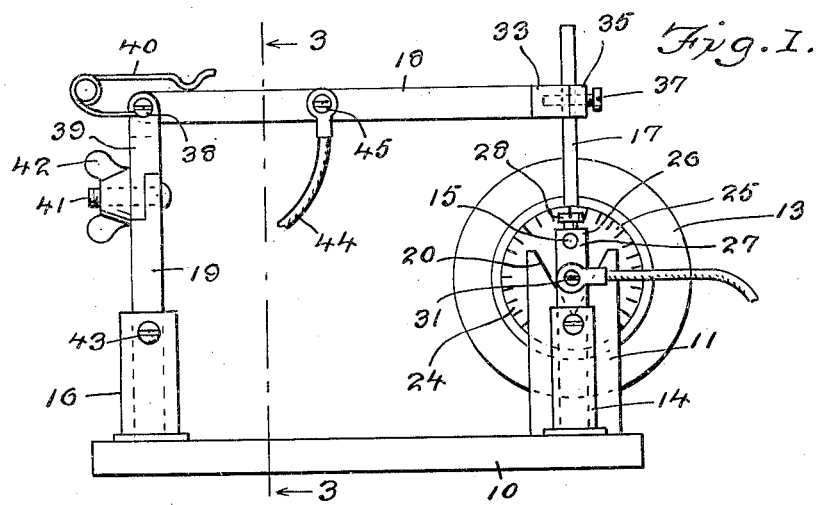
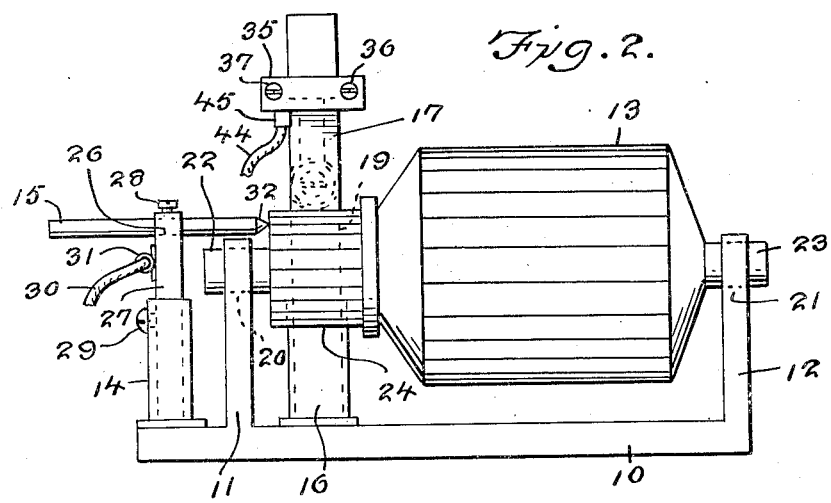
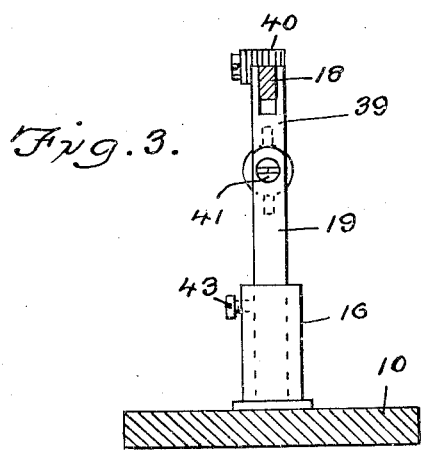
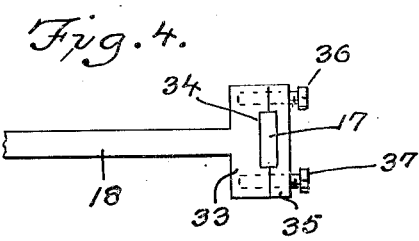

2,495,044

UNITED STATES PATENT OFFICE 2,495,044

ELECTRIC SOLDERING DEVICE FOR COMMUTATORS

James Bernard Williams, Minden, La.

Application August 23, 1948, Serial No. 45,656

3 Claims. (Cl. 219—12)

This invention relates to electric soldering devices, particularly used for commutator bars of armature shafts of motors, generators, and the like, and in particular the invention includes a comparatively small tool in which an armature may be rotatably mounted, and which is provided with an adjustable electrode, adapted to engage the ends of commutator bars, and a carbon brush that is also adjustably mounted and positioned to engage the surfaces of the commutator bars.

The purpose of this invention is to provide means for readily applying solder on the commutator bars of an armature which is adapted to function instantly with substantially no waste of solder, and which may be operated by the average layman.

Various methods have been used for fusing the solder on the commutator bars of an armature, and because each bar must be soldered separately and the armature held while the solder is being applied, the soldering requires an expert. With this thought in mind this invention includes a comparatively small stand having uprights with notches in the ends in which an armature may be freely positioned, and adjustable stands for supporting an electrode and carbon brush, so that the parts may be readily adjusted for armatures of different sizes.

The object of this invention is, therefore, to provide a soldering tool having an electrode and a carbon brush that may readily be connected to a suitable welding circuit, and means for mounting an armature wherein the brush and electrode may contact each of the commutator bars thereof independently.

Another object of the invention is to provide a soldering tool for commutator bars that may be operated without a skilled mechanic.

Another object of the invention is to provide a soldering tool for commutator bars in which the elements may readily be adjusted to bars of different sizes.

A further object of the invention is to provide a unique soldering tool or commutator by which the bars may be soldered independently and by the average layman, which is of a simple and economical construction.

With these and other objects and advantages in view, the invention consists of the new and useful combination, construction, and arrangement of parts as hereinafter more fully described, set forth in the claims appended hereto, and disclosed in the accompanying drawings forming part hereof, wherein:

Figure 1 is a view showing an end elevation of the tool with an armature positioned therein.

Figure 2 is a view showing a side elevation of the tool, also with an armature positioned therein.

Figure 3 is a view showing a cross section through the tool taken on line 3—3 of Figure 1, showing the adjustable post by which the carbon brush is carried.

Figure 4 is a plan view showing the outer end of the carbon brush supporting arm.

Referring now to the drawings wherein like reference characters denote corresponding parts, the electric soldering tool of this invention includes a base 10, having uprights 11 and 12 for holding an armature, as indicated by the numeral 13, a tubular post 14 for supporting an electrode 15, and a tubular stand 16 for supporting a carbon brush 17, the brush being held at the end of an arm 18 which is supported in a post 19.

The base 10 may be of any suitable shape or design, and the upper ends of the uprights 11 and 12 are provided with V-shaped recesses 20 and 21, respectively, in which the ends 22 and 23 of the armature shaft are freely held.

In the design shown, an armature 13 is mounted on the shaft and a commutator 24 is provided at one end of the armature. The commutator is formed with a plurality of bars 25 which are separated by mica or other insulation. This tool makes it possible to provide a circuit through the bars one at a time, which causes heat therein that fuses the solder effecting a perfect electrical and mechanical bond between the wires of the winding and bars.

The electrode 15 is removably held in a socket 26 in the upper end of a bar 27 by a screw 28, and the bar 27 is adjustably held in the tubular post 14 by a screw 29. An electric cable 30 is attached to the bar 27 at the point 31. With the electrode mounted in this manner it may readily be raised and lowered to compensate for commutator bars of different sizes, and with the electrode aligned with the center of the armature shaft, the point 32 thereof may be adjusted to contact the ends of each of the commutator bars separately.

The carbon brush 17 is mounted in the outer end 33 of the arm 18, as shown in Figures 1 and 4, and the brush is clamped in a recess 34 by a plate 35 which is held by screws 36 and 37. The inner end of the arm 18 is pivotally mounted on a pin 38 in an upper section 39 of the post 19, and the arm 18 is resiliently urged downwardly by a spring 40, as shown in Figure 1. The section 39 is pivotally attached to the post 19 by a screw 41 with a thumb nut 42 thereon, and by this means the arm 18 may be turned so that the brush may be held in a horizontal position to engage vertical face commutators. The post 19 is adjustably held in the stand 16 by a screw 43, and a cable 44 may be attached to the bar 18 at the point 45.

With the parts arranged in this manner, the electrode and carbon brush may readily be adjusted to contact the end and face of a commutator bar, and as current is supplied thereto, the bar will be heated to flux the solder as hereinbefore described.

It will be understood that modifications may be made in the design and arrangement of the parts without departing from the spirit of the invention.

What is claimed is:

1. An armature welding stand comprising a base having spaced uprights with armature receiving recesses in the upper ends extended upwardly therefrom, a post having an electrode holding socket in the upper end mounted on the base spaced from one of said uprights and positioned in a vertical plane extended through the axis of an armature positioned in the recesses of the uprights, a tubular stand also mounted on said base, an arm having a carbon holding socket in the outer end carried by said tubular stand, said tubular stand positioned whereby a carbon in the socket of the arm thereof is also in the vertical plane extended through the axis of an armature in the recesses of the uprights and wherein the lower end of the carbon contacts the surface of a commutator bar of the armature with an electrode in the socket in the upper end of the post in engagement with the end of the same commutator bar, and electrical connections for supplying current to the electrode in the post and the carbon in the arm of the tubular stand.

2. An armature welding stand comprising a base having spaced uprights with armature receiving recesses in the upper ends extended upwardly therefrom, a post having an electrode holding socket in the upper end mounted on the base spaced from one of said uprights and positioned in a vertical plane extended through the axis of an armature positioned in the recesses of the uprights, means adjusting the position of the electrode holding socket in the upper end of the post, a tubular stand also mounted on said base, an arm having a carbon holding socket in the outer end carried by said tubular stand, said tubular stand positioned whereby a carbon in the socket of the arm thereof is also in the vertical plane extended through the axis of an armature in the recesses of the uprights and wherein the lower end of the carbon contacts the surface of a commutator bar of the armature with an electrode in the socket in the upper end of the post in engagement with the end of the same commutator bar, means adjusting the height of the tubular stand, and electrical connections for supplying current to the electrode in the post and the carbon in the arm of the tubular stand.

3. An armature welding stand comprising a base having spaced uprights with armature receiving recesses in the upper ends extended upwardly therefrom, a post having an electrode holding socket in the upper end mounted on the base spaced from one of said uprights and positioned in a vertical plane extended through the axis of an armature positioned in the recess of the uprights, means adjusting the position of the electrode holding socket in the upper end of the post, a tubular stand also mounted on said base, an arm having a carbon holding socket in the outer end carried by said tubular stand, said tubular stand positioned whereby a carbon in the socket of the arm thereof is also in the vertical plane extended through the axis of an armature in the recesses of the uprights and wherein the lower end of the carbon contacts the surface of a commutator bar of the armature with an electrode in the socket in the upper end of the post in engagement with the end of the same commutator bar, means adjusting the height of the tubular stand, means adjusting the position of the carbon carrying arm on the upper end of the tubular stand, means resiliently urging the said carbon carrying arm downwardly, and electrical connections for supplying current to the electrode in the post and the carbon in the arm of the tubular stand.

JAMES BERNARD WILLIAMS.

REFERENCES CITED

The following references are of record in the file of this patent:

UNITED STATES PATENTS

| Number | Name | Date |
| --- | --- | --- |
| 1,580,794 | Seltzer | Apr. 13, 1926 |
| 1,613,957 | Madden | Jan. 11, 1927 |
| 2,400,902 | Allen | May 28, 1946 |

FOREIGN PATENTS

| Number | Country | Date |
| --- | --- | --- |
| 562,690 | Great Britain | July 12, 1944 |